United States Patent [19]

Hatakeyama et al.

[11] Patent Number: 6,003,043

[45] Date of Patent: Dec. 14, 1999

[54] TEXT DATA REGISTERING AND RETRIEVING SYSTEM INCLUDING A DATABASE STORING A PLURALITY OF DOCUMENT FILES THERIN AND A PLURAL-CHARACTER OCCURRENCE TABLE FOR A TEXT INDEX AND AN UPDATE TEXT BUFFER TO RETRIEVE A TARGET DOCUMENT IN COOPERATION WITH THE DATABASE

[75] Inventors: Atsushi Hatakeyama, Kawasaki; Shunichi Torii, Musashino; Nobuo Kawamura, Atsugi; Yasushi Kawashimo, Hirakata, all of Japan

[73] Assignee: Hitachi, Ltd., Tokyo, Japan

[21] Appl. No.: 08/956,481

[22] Filed: Oct. 23, 1997

[30] Foreign Application Priority Data

Feb. 26, 1997 [JP] Japan ................................. 9-041904

[51] Int. Cl.⁶ ................................................. G06F 17/30
[52] U.S. Cl. ........................ 707/203; 707/102; 707/204; 707/3
[58] Field of Search .................................. 707/1, 3, 102, 707/103, 531, 201, 203, 204

[56] References Cited

U.S. PATENT DOCUMENTS

| | | | |
|---|---|---|---|
| 5,568,640 | 10/1996 | Nishiyama et al. | 707/1 |
| 5,685,003 | 11/1997 | Peltonen et al. | 707/531 |
| 5,706,365 | 1/1998 | Rangarajan et al. | 707/102 |
| 5,717,912 | 2/1998 | Millett et al. | 707/3 |
| 5,790,848 | 8/1998 | Wlaschin | 707/201 |
| 5,832,500 | 11/1998 | Burrows | 707/103 |
| 5,857,207 | 1/1999 | Lo et al. | 707/203 |
| 5,873,097 | 2/1999 | Harris et al. | 707/203 |

FOREIGN PATENT DOCUMENTS 8-190571  7/1996  Japan .
8-194718  7/1996  Japan .

OTHER PUBLICATIONS

IBM DB2, "Text Extender: Administration and Programming", IBM Web Site.

"Developing Applications with the Oracle ConText Option", An Oracle White Paper, Oct. 1996.

J.R. Davis, "Textbases", Open Information Systems, Jan. 1996, vol. 11, No. 1.

K. Yokosawa, "Human–Based Character String Image Retrieval From Textual Images", IEEE International Conference on Systems, Man and Cybernetics, vol. 3, Nov. 1989, pp. 1068–1069.

*Primary Examiner*—Wayne Amsbury
*Assistant Examiner*—Thuy Pardo
*Attorney, Agent, or Firm*—Beall Law Offices

[57] ABSTRACT

A text data registering and retrieving method capable of improving the transaction processing performance is provided. The document number of a document for which deletion or replacement has been newly requested is registered in an updated document number list. The text data of the document for which insertion or replacement has been newly requested is registered in an update text buffer. The text data stored temporarily in the update text buffer is registered in a plural-character occurrence file defining a text index in a character component file merge step. The data registered in the plural-character occurrence file is retrieved for query terms. The text data stored in the update text buffer is retrieved for the query terms. The document number of a document updated or deleted is deleted from the result of retrieval in the plural-character occurrence file. Also, the result or the document number obtained in the, update text buffer is added to the result of retrieval to provide a final retrieval result.

19 Claims, 7 Drawing Sheets

CHARACTER COMPONENT
DATA DIRECTORY

| CHARACTER COMPONENT | DATA POSITION | DATA LENGTH |
|---|---|---|
| A | 0 | 672 |
| AA | 672 | 1,364 |
| : | : | : |
| DOCUMENT | 23,654 | 568 |
| : | : | : |
| TOPIC | 132,864,678 | 866 |
| : | : | : |
| RETRIEVAL | 654,895,208 | 106 |
| : | : | : |

TEXT (DATABASE)

TEXT DATA REGISTERING AND RETRIEVING SYSTEM INCLUDING A DATABASE STORING A PLURALITY OF DOCUMENT FILES THERIN AND A PLURAL-CHARACTER OCCURRENCE TABLE FOR A TEXT INDEX AND AN UPDATE TEXT BUFFER TO RETRIEVE A TARGET DOCUMENT IN COOPERATION WITH THE DATABASE

BACKGROUND OF THE INVENTION

The present invention relates to a text index registering and retrieving method for retrieving text data registered and a recording medium of a program for executing the method. In particular, the present invention relates to a technique effectively applicable to the text index registering and retrieving method for acquiring the desired document by designating a query term (search term) consisting of a character string of a keyword and by thus searching a document database of the whole document.

Various conventional document retrieving methods for searching the document database storing a large amount of document have been proposed. One of the conventional methods is disclosed in JP-A-8-190571, in which a full text search is carried out efficiently using plural-character information to reduce retrieval noises, shorten the processing time and reduce the amount of operation of the storage disks of the database at the same time.

A document retrieving method will be described below specifically taking the Japanese language as an example.

Briefly, the above-mentioned method comprises the steps of storing a plural-character occurrence file as a text index with existence of a plurality of characters in text data of a document and referencing the existence of the plural characters stored in the plural-character occurrence file and determining a document containing the plural characters included in the query term in a designated conditional formula as a candidate of retrieval, wherein the plural-character store compression step includes the substeps of defining the number of the types (type number) of the plural-character components appearing in the textual data and the number of documents (document number) containing each of the plural-character components, registering a bit string including "1" at the position corresponding to the document number of the document in the case where the summation of documents containing the plural-characters is larger than a predetermined threshold value, and storing the document number of the same document as binary data in the case where the summation of documents is smaller than the threshold value. The plural-characters are called n-grams.

In this method, the document numbers for all the plural-character components in each document are registered in a plural-character occurrence file as text index, and a document containing all the plural-character components included in the query term is retrieved with reference to the plural-character occurrence file at the time of retrieval. The plural-character occurrence file (table) used in this case contains a list of document numbers for respective plural-character components, i.e., identifiers of the documents containing each plural-character component.

According to the above-mentioned conventional document retrieving method, the document numbers for all the plural-character components in each document are registered in the plural-character occurrence file. A text index for database having a great number of documents in store, however, includes a vast number of plural characters appearing in the documents, and the storage size of the text index becomes large, so that as many file accesses as the number of the unique types of plural characters contained in the document are required at the time of registration. The resulting problem is that a very long processing time is required for registering a new document or replacing or deleting a document registered in a large database. Fine searching algorithms which use the information of the position of the plural-characters in the document, require more index space so that the index size becomes much bigger than the original text size.

In deleting a specified document from the database, for example, all the document numbers for the related character components registered in the plural-character occurrence file are required to be deleted. A text index for a large database, however, may have a plural-character occurrence file of a capacity in the giga-byte order. It is practically not possible to update the database of this size on line, The foregoing description concerns a document retrieving method using plural-character components of the Japanese language. A method using words is known for English, however, using not any artificial plural-character components of the Japanese language, in which maintenance of indexes same as plural-character components is also a burdensome process when a large amount of documents are registered (Refer to Textbase, Open Information Systems January 1996, V11 n1). Another example of the troublesome work of updating the indexes (web search engine) for home pages of web on an internet is widely known. Also, as an example of indexes for texts on a database, the "IBM DB2 Text Extender Administration and Programming Guide" discloses a designation that the index is not updated immediately at the time of text registration at the time of defining a text index. On the other hand, Oracle's "Developing Application with the Oracle ConText Option" discloses a deferred index update mechanism. These conventional methods, however, disclose no means for solving the problem that the accuracy of retrieval using an index is adversely affected by the delay in updating the index. Specifically, these well-known techniques are intended to provide only means for avoiding the index updating in a time zone busy with retrieval by delaying the updating, but not any means for guaranteeing the retrieval accuracy which makes it possible to retrieve even a document that has just been registered.

A possible means against this problem is to store a second text index in main memory and all updating is performed by the second index thereby to eliminate the input/output time taking into consideration the fact that most of the time required for index updating is consumed for input and output with an external storage such as a magnetic disk. A succession of a great amount of updating work, however, increases the second index with the result that it is impossible for the second index to be resident in the main memory, and the update and retrieval work of the second index also requires the input/output operation, thereby considerably lowering the performance.

SUMMARY OF THE INVENTION

An object of the present invention is to provide text index management techniques for shortening the time required for registration, i.e., improving the transaction performance for document registration without adversely affecting the accuracy of the retrieval using a text index thereby to reduce the competition with the retrieval indirectly and thus realize a shortened retrieval processing time.

Another object of the present invention is to provide text index management techniques for stabilizing the performance at the time of registration and retrieval.

Typical aspects of the invention disclosed by the present application will be briefly described below.

Specifically, there is provided according to the invention a method of registering and retrieving text data, in which a document matching with designated query terms is retrieved with reference to the positional relation of the characters appearing in the document, and the information on the positional relation of the characters appearing in the text data for which registration has been requested is temporarily registered in an update buffer and used for retrieval before being registered in a plural-character occurrence file as a text index.

The text data registering and retrieving method described above can solve the above-mentioned problem using the process of steps described below.

(1) Updated Document Number Registration Step

The document number of a document for which replacement or deletion is newly requested is registered in an updated document number list.

(2) Update Text Buffer Preparation Step

The new text data of a document for which replacement or insertion is newly requested and/or the information indicating the positional relation of the characters contained in the particular text are registered in the update text buffer.

The normal registration process for a document is executed by the updated document number registration step (1) and the update text buffer preparation step (2).

(3) Plural-Character Occurrence File Merge Condition Determining Step

The timing of registering into the plural-character occurrence file the text data temporarily stored in the update text buffer is determined. This timing is the one when at least one of the following-described conditions is met:

(a) A request is issued from the system manager.
(b) A predetermined number of documents are registered in the update text buffer.
(c) The time required for the process of registration into the updated document number list and the update text buffer in the updated document number registration step and the update text buffer preparation step exceeds a predetermined time length.
(d) The time required for processing the update text buffer retrieval step and the retrieval result merge step exceeds a predetermined time length.
(e) A predetermined time point arrives.

The conditions (a) and (e) above are disclosed in IBM DB2 Text Extender Administration and Programming Guide described above, which fails to taste into account the deterioration of the registration processing time (condition (d)) and the deterioration of retrieval time (condition (c)) attributable to an increased number of updated documents. The condition (b) is the one from which the above-mentioned deterioration can be inferred, though indirectly.

(4) Plural-Character Occurrence File Merge Step

This step is activated when the predetermined conditions are met in the plural-character occurrence file merge condition determining step (3), so that the text temporarily stored in the update text buffer and/or the information indicating the positional relation of the characters appearing in the text as a text index are registered in the plural-character occurrence file.

The document number registered in the updated document number list prepared in the updated document registration step (1) is deleted from the character component file. Then, the document number associated with the plural-character component contained in the text data of the update text buffer prepared in the update text buffer preparation step (2) is additionally registered in the plural-character occurrence file.

(5) Plural-Character Occurrence File Retrieval Step

At the time of retrieval, the data already registered in the plural-character occurrence file is retrieved.

(6) Update Text Buffer Retrieval Step

At the time of retrieval, the data not yet registered in the plural-character occurrence file, i.e., the text data stored in the update text buffer and/or the information indicating the positional relation of the characters appearing in the particular text is retrieved.

(7) Retrieval Result Merge Step

At the time of retrieval, all documents which have been deleted or replaced should be eliminated from the retrieval results which are obtained step (5). The document's numbers in these retrieval results which also are found in the updated document number list are eliminated as invalid documents. Then, the result of retrieval obtained in the update text buffer retrieval step (6), i.e., a corresponding document number is added.

The registration of a new document requires only the registration in the updated document number list and the update text buffer having a light processing load, and thus can shorten the response time.

As a result of the provision of the updated document number list and the update text buffer as described above, both the plural-character occurrence file and the update text buffer are used for retrieval.

The update text buffer retrieval process, however, depends on the utilization size of the update text buffer. Even in the case where high speed means such as the plural-character occurrence file is lacking and means for searching the text sequentially is used, the deterioration of the performance of the retrieval process as a whole can be sufficiently suppressed by minimizing the utilization size sufficiently.

The present aspect will become more preferred for user's desire of faster retrieval even slightly, than the accurate retrieval result, if the execution of retrieval of the updated document text is optional at the time of retrieval request. In such a case, the retrieval performance can be limited to the retrieval requesting the accurate retrieval result.

The utilization size of the update text buffer also affects the time required for registration. Specifically, the time required for registration and retrieval for the update text buffer increases with the size thereof.

As a specific example, when the utilization size of the update text buffer is small, the update text buffer can be resident in the main memory. In the case where the utilization size of the update text buffer is large, on the other hand, the update text buffer cannot be accommodated in the main memory and input/output (I/O) operations are required in the registration and retrieval with the update text buffer.

For this reason, in accordance with the condition set forth in the plural-character occurrence file merge condition determining step (3), the text data of the update text buffer is added to and registered in the plural-character occurrence file in the plural-character occurrence file merge step (4).

As a result, the utilization size of the update text buffer is kept at a proper amount, and the proper response performance can be maintained for both the registration and the retrieval processes. Specifically, the effect of the retrieval process on the performance is minimized while improving the registration processing performance.

As described above, according to the above-mentioned text index registering and retrieving method, the document registration can be completed in the updated document number list and the update text buffer with the light processing load, and therefore the transaction processing performance can be improved.

Other objects, features and advantages of the present invention will become apparent from reading of the description of the embodiments taken in conjunction with the accompanying drawings.

DESCRIPTION OF THE PREFERRED EMBODIMENTS

Now, embodiments of the present invention will be explained with reference to the accompanying drawings.

Description will be made of an apparatus for executing a text index registering and retrieving method according to an embodiment of the present invention, in which the desired document is acquired by retrieving a document database by designating query terms constituting a predetermined character string.

Figure 1:
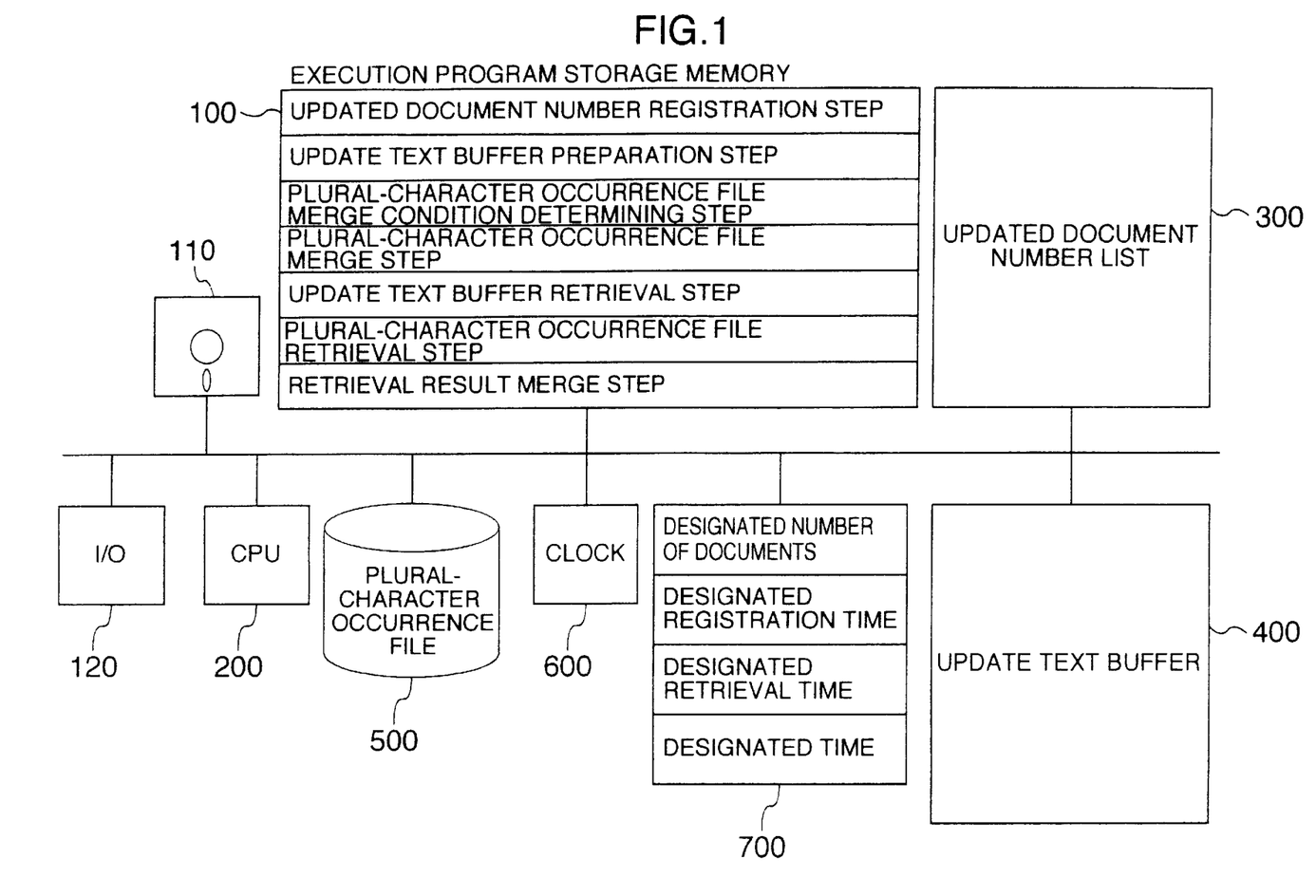
FIG. 1 is a diagram schematically showing a configuration of an apparatus for carrying out a text index registering and retrieving method according to an embodiment of the invention.

FIG. 1 schematically shows a configuration of an apparatus for executing a text index registering and retrieving method according to this embodiment. In FIG. 1, reference numeral 100 designates a memory providing a work area where a program for executing the data registering and retrieving method is resident, a numeral 110 designates a medium for storing the above-mentioned program, numeral 120 an input/output unit, numeral 200 a central processing unit (CPU), numeral 300 an updated document number list (memory), numeral 400 an update text buffer, numeral 500 a plural-character occurrence file (table), numeral 600 a clock, and numeral 700 a memory for storing management information.

As shown in FIG. 1, an apparatus for executing the text index registering and retrieving method according to this embodiment comprises the memory 100 for storing programs for registration and retrieval, the medium 110 for storing the programs, the CPU 200 for executing the programs, the updated document number list 300 for storing the updated document numbers, the update text buffer 400 for storing the data on the updated documents, the plural-character occurrence file 500 for storing character components, document numbers and positions of the documents containing the character components, the clock 600 for reporting the current time to the plural-character occurrence file merge determining step at regular time intervals, and the memory 700 for storing the condition setting values used by the character component merge determining step as the conditions for determining the character component merge.

First, an explanation will be given of a method of registering a document using a test index registering and retrieving apparatus according to this embodiment.

Figure 2:
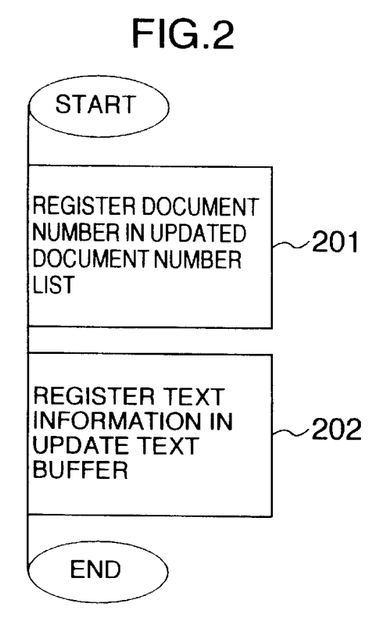
FIG. 2 is a PAD diagram showing the flow of the process of document registration in an apparatus for carrying out a text index registering and retrieving method according to the embodiment.

FIG. 2 is a PAD diagram showing the flow of the document registration process for a text index registering and retrieving apparatus according to this embodiment.

As shown in FIG. 2, in the document registration process by the text index registering and retrieving apparatus according to this embodiment, the document to be registered is assumed to have a document number for identifying the particular document and text data. The registration process includes the updated document number registration step for registering the document number in the updated document number list 300 (step 201), and the update text buffer preparation step for registering the text information in the update text buffer 400 (step 202).

In the updated document number registration step 201, the document number of the document to be registered is registered in the updated document number list 300 stored in a memory (RAM) or a magnetic disk.

Figure 3:
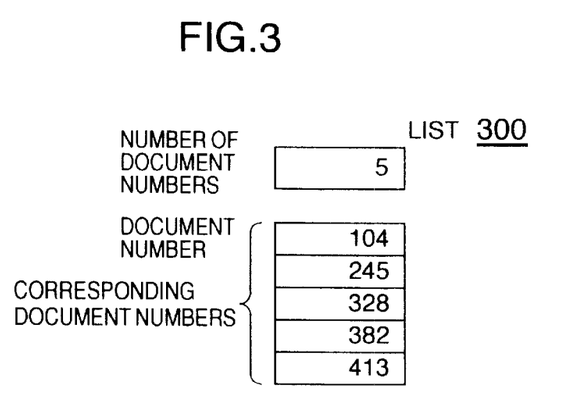
FIG. 3 is a diagram showing a structure of an updated document number list 300 of an apparatus for carrying out a text index registering and retrieving method according to the embodiment.

FIG. 3 shows a data structure of the updated document number list 300 of a text index registering and retrieving apparatus according to this embodiment.

As shown in FIG. 3, the updated document number list 300 for the text index registering and retrieving apparatus according to this embodiment stores the updated document number providing the document number of the document to be registered in an arrangement of numerical data and has a structure with the number of the stored document numbers as the leading data in the arrangement.

The update text buffer preparation step 202 performs the process of adding the document data to the update text buffer 400.

Figure 4:
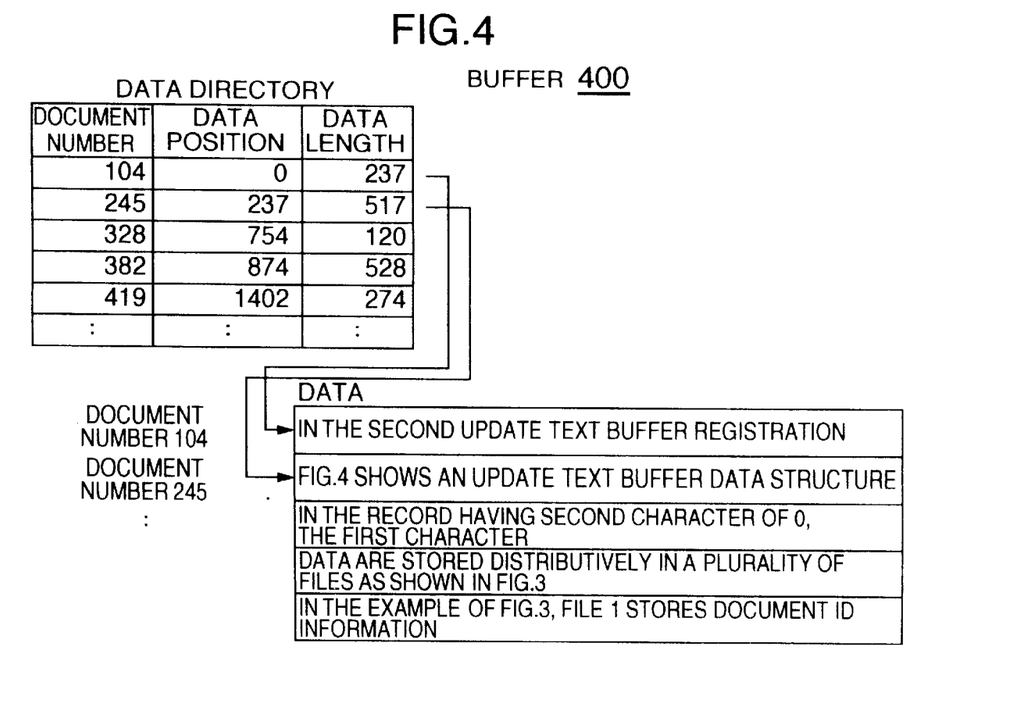
FIG. 4 is a diagram showing a data structure of an update text buffer 400 of an apparatus for carrying out a text index registering and retrieving method according to the embodiment.

FIG. 4 is a diagram showing a data structure of the update text buffer 400 of a text index registering and retrieving apparatus according to this embodiment.

As shown in FIG. 4, the update text buffer 400 of the text index registering and retrieving apparatus according to this embodiment includes a data directory and a data section. The data directory stores the starting position and the length of the text data stored in the data section of each data together with the document number. When a new or renew document is registered to the plural-character occurrence file, a data of the document is written after the last of the data section of the file and the position of the data section and the data length written after the last of the directory section are registered together with the document number.

In this way, the provision of the updated document number list 300 and the update text buffer 400 can simplify the registration process compared with the registration into the plural-character occurrence file.

Now, an explanation will be given of the document retrieval operation of the text index registering and retrieving apparatus according to this embodiment.

Figure 5:
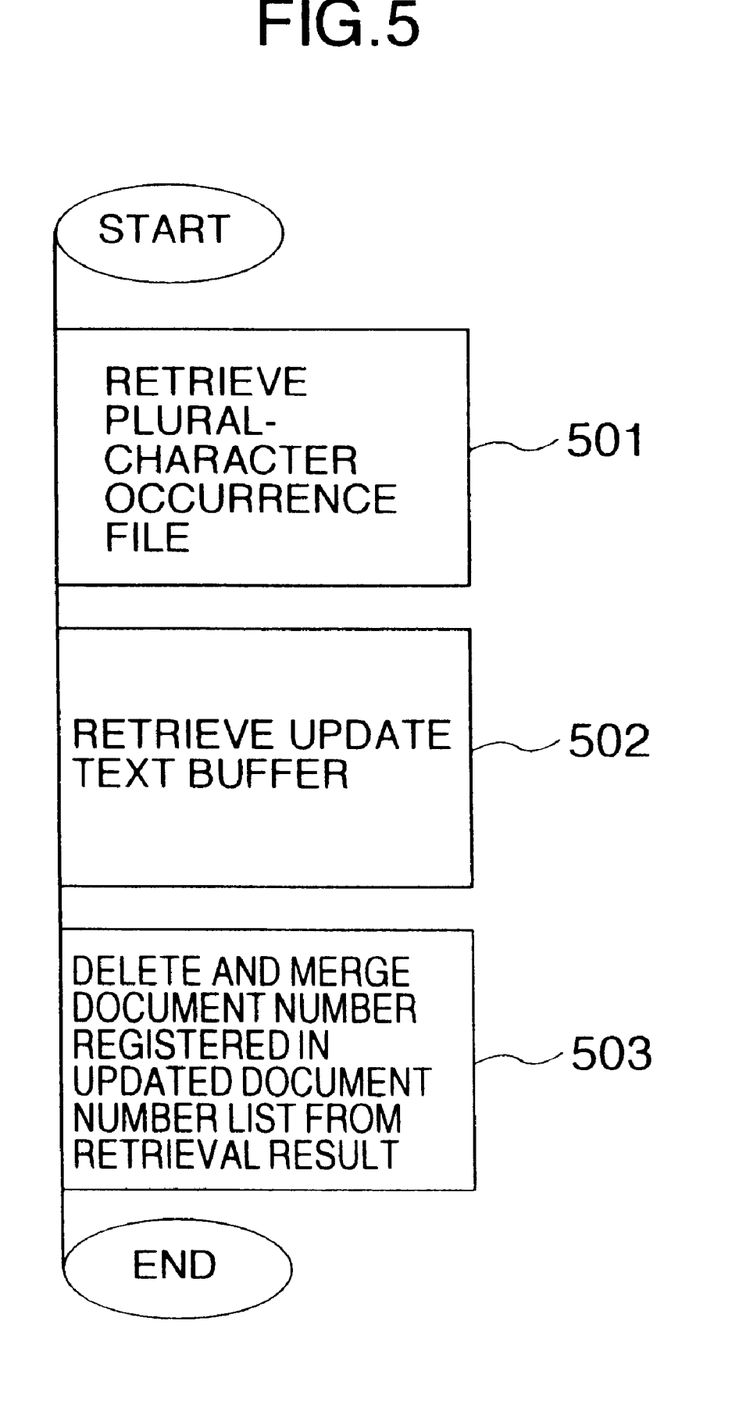
FIG. 5 is a PAD diagram showing the flow of the document retrieval process of an apparatus for carrying out a text index registering and retrieving method according to the embodiment.

FIG. 5 is a PAD diagram showing the flow of the document retrieval process of the text index registering and retrieving apparatus according to this embodiment.

As shown in FIG. 5, in the document retrieval process of the text index registering and retrieving apparatus according to this embodiment, query terms including keywords is designated, and documents which satisfy the particular query terms are searched for from the document data in the plural-character occurrence file 500 and the update text buffer 400, and the related document numbers are outputted in a predetermined format of arrangement.

The retrieval process of the text registering and retrieving apparatus according to this embodiment includes the plural-character occurrence file retrieval step for retrieving the plural-character occurrence file 500 (step 501), the update text buffer retrieval step for retrieving the data contained in the update text buffer 400 (step 502) and the retrieval result merge step for deleting the document numbers registered in the updated document number list 300 from the retrieval result of the plural-character occurrence file retrieval step and adding the result of the update text buffer retrieval to the plural-character occurrence file retrieval result (step 503).

The plural-character occurrence file retrieval step 501 reads from the disk of the plural-character occurrence file 500 and the character component data which corresponds to the query terms and outputs the document number of the document satisfying the query terms, i.e., a document containing all the relevant character components.

Figure 6:
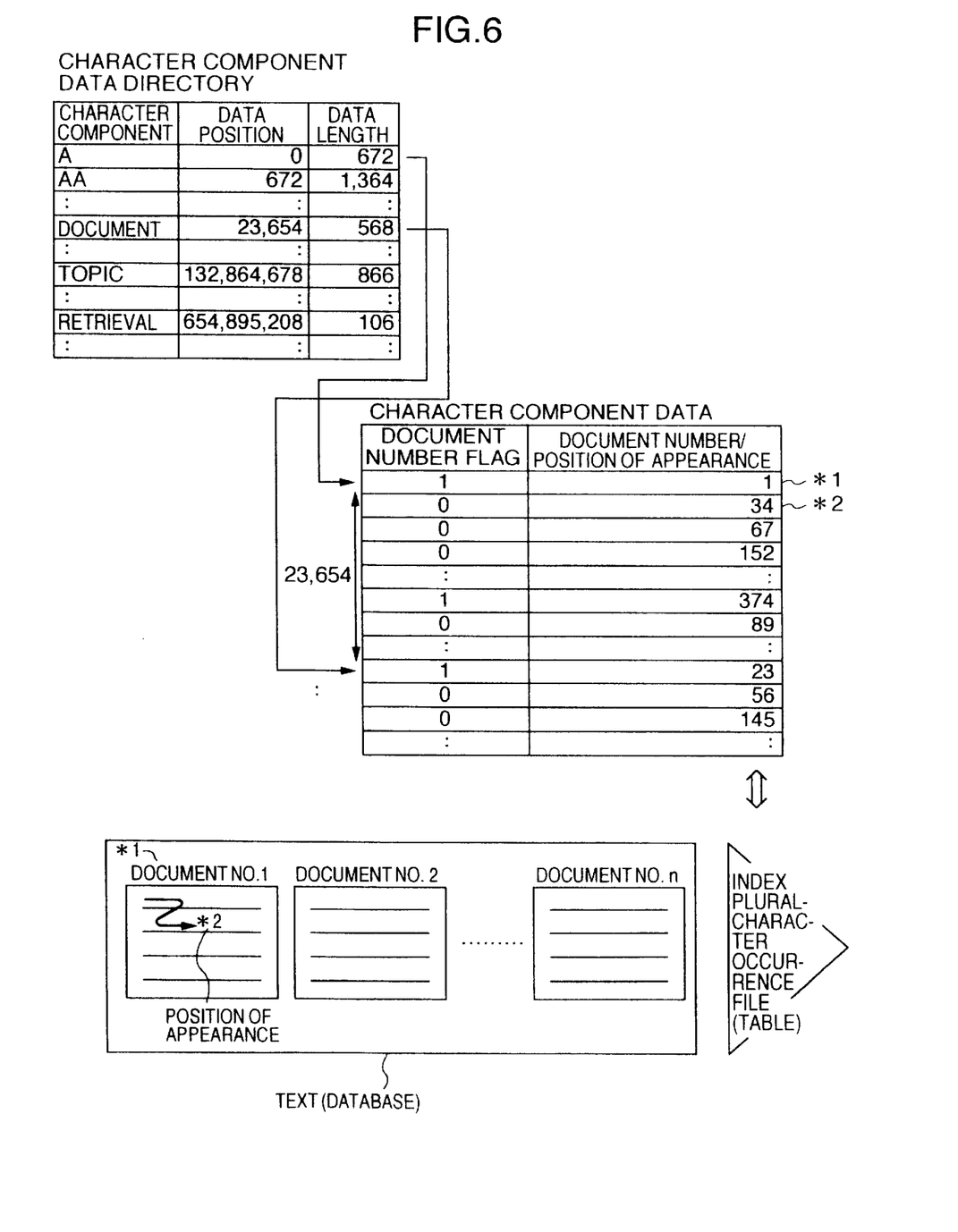
FIG. 6 is a diagram showing a structure of a plural-character occurrence file 500 of an apparatus for carrying out a text index registering and retrieving method according to the embodiment.

FIG. 6 is a diagram showing a structure of the plural-character occurrence file 500 of the text index registering and retrieving apparatus according to this embodiment. The data structure of this file can be one disclosed, for example, in JP-A-8-194718 filed by the present assignee and laid open on Jul. 30, 1996.

As shown in FIG. 6, the plural-character occurrence file 500 of the text index registering and retrieving apparatus according to this embodiment includes a character component data directory and character component data.

The character component data directory stores pointer information to the character component data indicating the positions of appearance and the document number of each document which contain the character components of the string of more than one character.

The character component called "document" in FIG. 6, for example, indicates the presence of the character component data of 568 bytes from the 23,654th byte from the head of the plural-character occurrence data file.

The character component data includes the document number and the position of appearance of the corresponding character component. A document number flag is added to each data in order to determine whether the data indicates the document number or the position of appearance or occurrence.

Specifically, in the case where the document number flag is "1", for example, the particular index indicates the document number, while the document number flag of "0" indicates the position where the particular index appears. The example of FIG. 6 indicates that the character component "document" exists at the 56th character and the 145th character of the document number 23.

In the character component file retrieval step, the document satisfying the character component constituting the query terms and the position of appearance thereof are read from the plural-character occurrence file 500, so that the documents adjacent to the particular character component are extracted.

In the case of retrieval with the terms "document retrieval", for example, the document number in which two character components including "document" and "retrieval" and the position of appearance thereof are read out in FIG. 6, and the positions of appearance of the respective character components are compared with each other, thereby making it possible to accurately retrieve the document in which the terms "document retrieval" appear.

The relation between the plural-character occurrence data (table) and the text (database) is illustrated by an example with indications *1 and *2 in FIG. 6.

The update text buffer retrieval step 502 retrieves a document newly registered after preparation of the plural-character occurrence file.

The documents newly registered are stored in the update text buffer 400 as shown in FIG. 4. The document number of each document and the length thereof in the buffer are read from the index directory, and the corresponding text data is scanned. In other words, coincidence with the query terms is determined based on the string match algorithm such as Knuth-Morris-Pratt (KMP) to perform the retrieval of the newly registered document.

In the text index registering and retrieving apparatus according to this embodiment, the retrieval process of the update text buffer 400 is realized by scanning the text data stored in the update text buffer 400. Alternatively, apart from the main plural-character occurrence file 500, a small-scale or secondary plural-character occurrence file may be prepared as an update text buffer and be retrieved with equal effect.

In such a case, the data configuration of the update text buffer 400 shown in FIG. 4 is identical to that of the plural-character occurrence file 500 shown in FIG. 6. The data stored in the secondary plural-character occurrence file of the update text buffer 400, however, is limited to the newly-registered text data after all.

As described above, the speed of retrieval can be increased by employing a data configuration of the update text buffer identical to that of the plural-character occurrence file 500 different from the plain text.

Also, the update text buffer 400 may be included in a physical memory or configured in a magnetic disk apparatus or the like secondary storage medium.

In the case where the update text data is stored in a physical memory such as the main memory of the computer, the registration and retrieval process can be executed at high speed. The amount of the registration in the update text buffer 400, however, is limited to the capacity of the physical memory. The plural-character occurrence file merge process described later is thus required before the remaining capacity of the update text buffer 400 becomes insufficient.

When an update text data is stored in a magnetic disk apparatus, on the other hand, the speed of registration and retrieval is decreased. Nevertheless, a greater amount of the update text data can be stored in terms of memory capacity.

In the retrieval result merge step 503 for deleting the document number registered in the updated document number list, the document newly updated after registration in the plural-character occurrence file 500 is deleted from the result of the plural-character occurrence file retrieval to prevent a repeated retrieval error.

Assume that the plural-character occurrence file retrieval step produces the documents numbers 21, 87, 104, 251 and so on, for example, and that the update document number list 300 is in the state as shown in FIG. 3. The document number 104 is deleted from the mass of the result of retrieval of the plural-character occurrence file.

Then, in the retrieval result merge step 503, the result of the update text buffer retrieval step is added to the retrieval result in the plural-character occurrence file retrieval step in which the document number registered in the updated document number list 300 has been deleted.

Now, explanation will be given of the plural-character occurrence file merge step and the plural-character occurrence file merge condition determining step of the text index registering and retrieving apparatus according to this embodiment.

The plural-character occurrence file merge step executes the process in the case where the requirement for merging the plural-character occurrence file 500 is determined in the plural-character occurrence file merge condition determining step described later. Specifically, the character component data of the update text buffer 400 shown in FIG. 4 is added to the plural-character occurrence file 500 shown in FIG. 6.

The secondary plural-character occurrence file described above can of course be used as a configuration of the update text buffer 400. In such a case, each character component of the update text buffer 400 is merged with the plural-character occurrence file 500 of the regular size.

The plural-character occurrence file merge condition determining step determines that the data in the update text buffer 400 are required to be merged with the plural-character occurrence file 500 in the following cases:
(a) A request is issued from the system manager.
(b) A predetermined number of documents are registered in the update text buffer 400.
(c) The time required for registration in the updated document number list 300 and the update text buffer 400 in the updated document number registration step and the update text buffer 400 preparation step exceeds a predetermined time length.
(d) The time required for the process in the plural-character occurrence file retrieval step and the retrieval result merge step exceeds a predetermined time length.
(e) A predetermined time point arrives.

The plural-character occurrence file merge determining step determines the merge process according to this standard, and initiates the plural-character occurrence file merge step. For this purpose, the plural-character occurrence file merge determining step constantly monitors a request which may come from the system manager, the number of documents stored in the update text buffer 400, the processing time per document in the update text buffer 400 preparation step, the processing time in the plural-character occurrence file retrieval step and the retrieval result merge step, and the present time.

Figure 7:
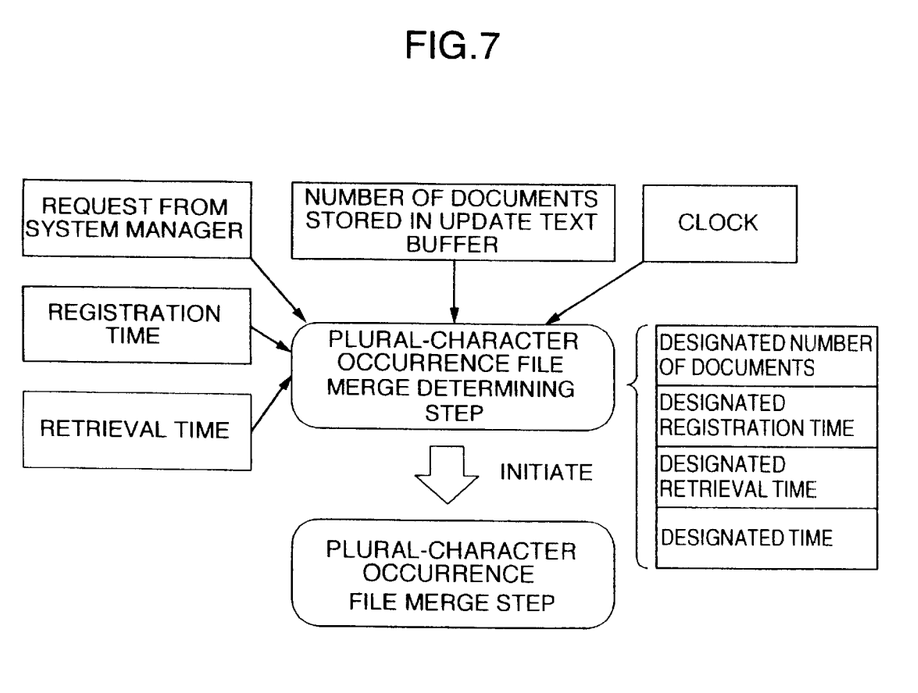
FIG. 7 is a diagram schematically showing the process of the plural-character occurrence file merge determining steps of an apparatus for carrying out a text index registering and retrieving method according to the embodiment.

FIG. 7 is a diagram schematically showing the process in the plural-character occurrence file merge determining step of the text index registering and retrieving apparatus according to this embodiment.

As shown in FIG. 7, in the plural-character occurrence file merge determining step of the text index registering and retrieving apparatus according to this embodiment, the registration time represents the time of registration in the updated document number list 300 and the update text buffer 400 in the updated document number registration step and the update text buffer preparation step. The retrieval time, on the other hand, indicates the time required for executing the process in the plural-character occurrence file retrieval step and the retrieval result merge step.

As shown in FIG. 7, the plural-character occurrence file merge determining step is supplied with signals representing (1) a request from the system manager, (2) the number of documents stored in the updated text buffer 400, (3) the registration time, (4) the retrieval time, and (5) the current time indicated by the clock 600, compares them with a designated number of documents, a designated registration time, a designated retrieval time and a designated time set in advance, and initiates the plural-character occurrence file merge step in the case where the conditions are fulfilled.

Figure 8:
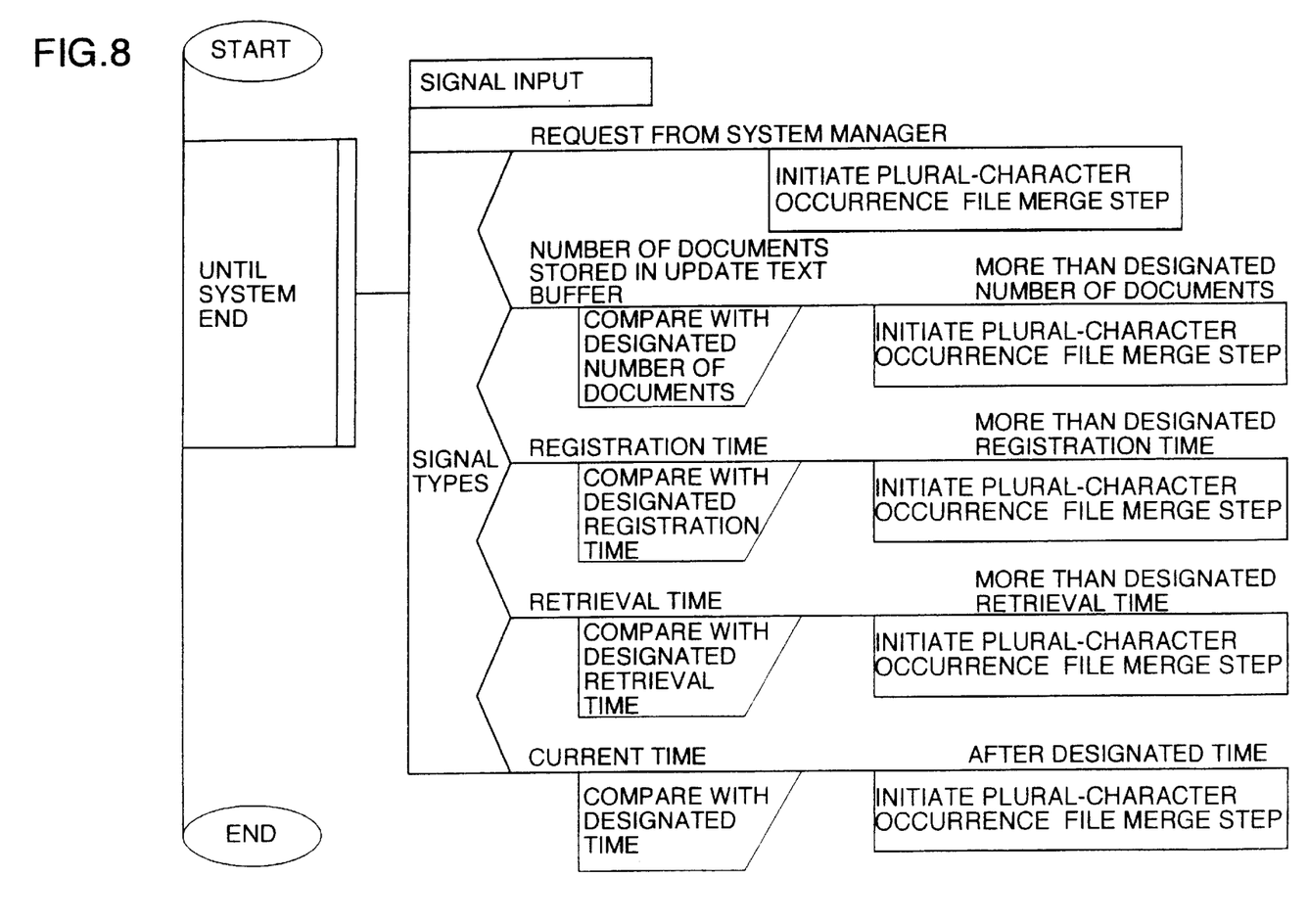
FIG. 8 is a PAD diagram showing the flow of the plural-character occurrence table merge determining steps of an apparatus for carrying out a text index registering and retrieving method according to the embodiment.

FIG. 8 is a PAD diagram showing the flow of the plural-character occurrence file merge determining step of the text index registering and retrieving apparatus according to this embodiment.

As shown in FIG. 8, the plural-character occurrence file merge determining step of the text data registering and retrieving apparatus according to the present embodiment waits for the above-mentioned signal, and if some signal is inputted thereto, determines the above-mentioned set value in accordance with the type of the particular signal and initiates the plural-character occurrence file merge step.

In the case where there is a request from the system manager, the plural-character occurrence file merge step is immediately initiated. When the number of documents stored in the update text buffer 400 is reported, it is compared with the designated number of documents set in advance. If the documents in the number exceeding the designated number of documents are stored in the buffer, the plural-character occurrence file merge step is initiated.

In the case where the registration time is reported, on the other hand, it is compared with the designated registration time. If a longer time is required for the registration process than the designated registration time, the plural-character occurrence file merge step is initiated. The execution of the plural-character occurrence file merge step vacates the update text buffer 400, thereby increasing the speed of the next registration process.

In the case where the retrieval time is reported, it is compared with the designated retrieval time. If a longer time is consumed for the retrieval process than the designated retrieval time, the plural-character occurrence file merge step is initiated. The information in the secondary plural-character occurrence (file) table temporarily prepared for update or the update text buffer 400 is reflected in the regular plural-character occurrence table and thereby the speed of the next retrieval processing is increased.

In the case where the current time is reported, it is compared with the designated time. If the current time thus reported has passed the designated time, the plural-character occurrence file merge step is initiated.

The numerical values used for determination in (b) to (e) above are set by the system manager. For example, the number of documents is designated as 1000, the registration time is designated as 10 seconds, the retrieval time is designated as 5 seconds, and the designated time is set to 24 hours.

These numerical values are determined based on which factor of emphasis is placed, the registration time performance, the retrieval time performance or the operation time. These values can of course be set as default values of the program.

The plural-character occurrence file merge determining step is described above. In the text data registering and retrieving apparatus according to this embodiment, the plural-character occurrence file merge determining step is realized by the several determining conditions of (a) to (e) above. In spite of this, one of these several determining conditions can be determined as a condition for execution of the plural-character occurrence file merge step.

As described above, in the text data registering and retrieving apparatus according to this embodiment, the document registration can be completed by registration in the updated document number list and the update text buffer both of which can be easily processed. Therefore, the transaction processing performance can be improved.

Figure 9:
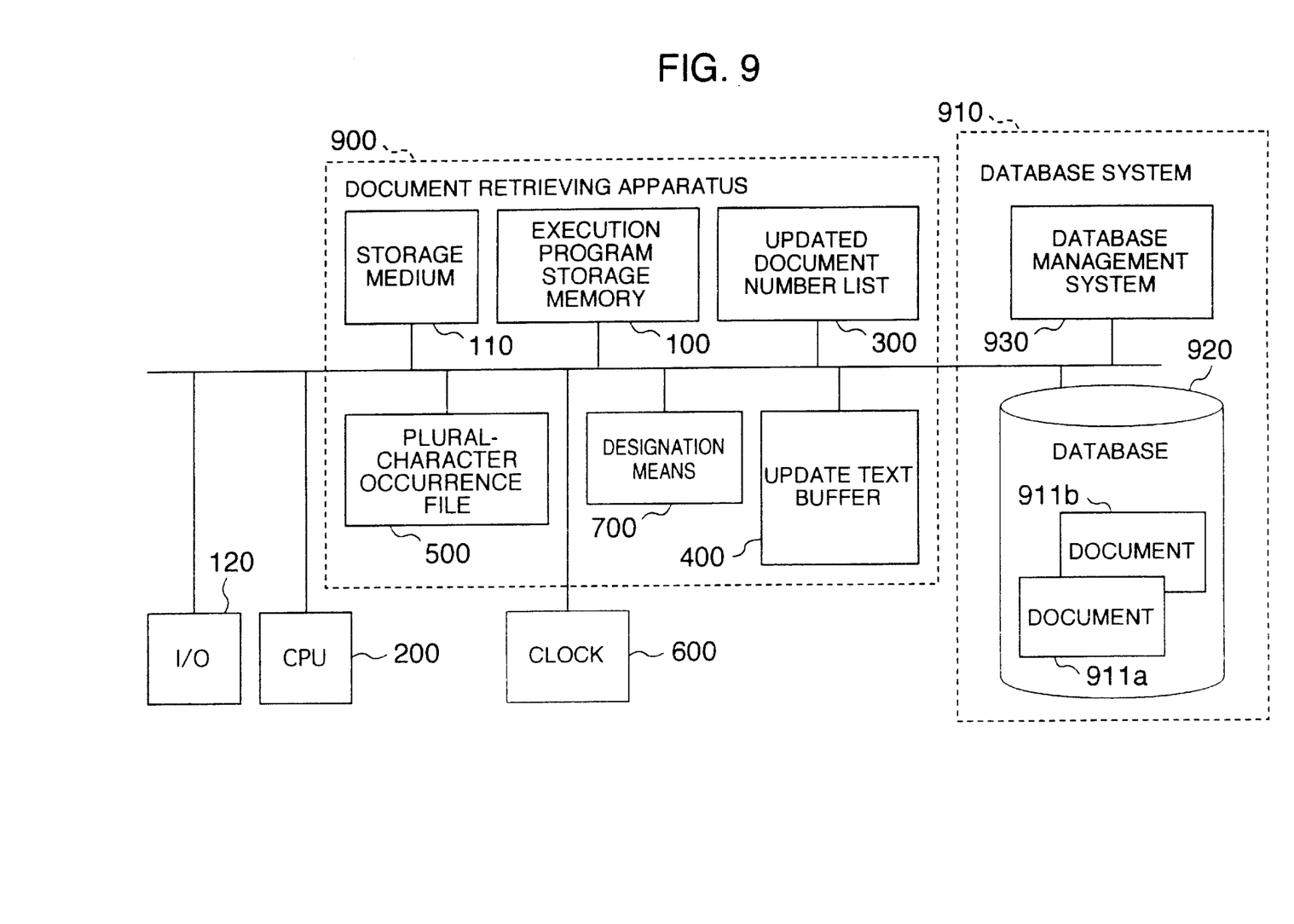
FIG. 9 is a diagram schematically showing a block configuration of another embodiment in which the present invention is combined with a database system.

FIG. 9 is a diagram showing an embodiment in which a document retrieving apparatus 900 as described above is combined with a database system 910. The database system 910 includes a database 920 for storing document data and a database management system (program) 930 for managing the database 920. In this configuration, a document retrieving apparatus 900 operates as an index subsystem for the database system 910.

The database system shown in FIG. 9 may be a relational database. Upon receipt of a request for registration in the document database 920 by the database system 910, for example, the database management system (program) 930 involved not only writes the document in the database 920 under its control as a part of a record in the table but also automatically requests the document retrieving apparatus 900 to execute the document registration as shown in FIG. 5. When the database system 910 receives a retrieval request, a request is issued to the document retrieving apparatus 900 to execute the document registration as shown in FIG. 5. Further, the particular document is read out from the database 920 under its control using the document number received as a result of the retrieval. In the case of this relational database, a document is stored in the column of a record in the relational database. So, using the record ID instead of the document number is preferable to access the record faster, as the usual relational index has the record ID to access the record. The database 920 includes not only a secondary memory unit such as a magnetic disk but also a database buffer in the main memory for improving the performance.

The database system 910 shown in FIG. 9 can be a simple file system. If the file name is used as a document number, a corresponding file can be conveniently read quickly from the retrieval result. In such a case, provision of means for requesting the execution of the document registration to the document retrieving apparatus 900 as shown in FIG. 2 in synchronism with the registration of the document in the database (writing in the file) is preferable for assuring the consistency between the document retrieving apparatus 900 and the database system 910.

The embodiment of FIG. 9 shows a configuration of the document retrieving apparatus 900 with an independent database system 910. Alternatively, a configuration can be employed in which the program stored in an execution program storage memory 100 is included in the database management system (program) 930. All or combination of the update text buffer 400, the updated document number list 300, the plural-character occurrence table 500 and the file merge condition designation means 700 can be stored in the database 920.

Although FIGS. 1 and 9 show examples in which a single text index is included in the system, a plurality of text indexes can alternatively be included. In the case where a plurality of plural-character occurrence tables (text indexes) are involved, a plurality of the update text buffers 400, the updated document number lists 300 and the plural-character occurrence tables 500 and the file merge condition designation means 700 can be provided. In the configuration of FIG. 9 in which the database system is a relational database, different text indexes can be provided for different columns of the table of the relational database.

Also, despite using the text index based on a concatenation of characters in the detained description of FIG. 1, the present invention is applicable also to a text index on a word basis widely used for the English language. Further, the invention is not limited to the text index, but can be applied also in the case where the whole processing time of updating the record is increased as indexes are designated for a great number of columns in the table 500 and a plurality of B-tree indexes are updated at the time of updating the record.

In the configuration of FIG. 9 the contents of the document to be updated exist in both the database 920 and the update text buffer 400 redundantly.

By employing a method of retrieving the contents of the document to be updated from the database 920 using the updated document number list 300, the update text buffer 400 can be omitted. This is, however, at the sacrifice of a lowered performance of retrieval of the updated document text.

In the elimination of the updated text buffer, the update document number registration step has to register the document numbers of not only replaced and deleted documents but also inserted documents. The update type information of deletion, replacement and insertion which is stored with the documents number in the update document number list may be useful to perform maintenance of the plural-character occurrence table.

There are variations of the updated document list and the update text buffer. The embodiment with reference to FIGS. 1–8 can avoid unnecessary registrations and preparations in that the updated document number list may contain only the document number of deleted or replaced documents, but does not require inserted ones, and the update text buffer may contain only new contents of replaced or inserted documents but does not require old contents of deleted or replaced ones.

If the plural-character occurrence file has a valid/invalid table for each document number to improve the performance of the deletion and the replacement, the update document number list can be eliminated, but the invalidation of the deleted or replaced documents becomes necessary for the plural-character occurrence file. The replace operation is implemented with the combination of the deletion of the old document and the insertion as a new document.

The possibility of the elimination of the update text buffer in the embodiment of FIG. 9, has been discussed hereinbefore, in that the database may be used as the update text buffer.

The present invention is explained above specifically based on an embodiment. The invention, however, is not limited to this embodiment, but can of course be modified in various ways without departing from the scope and spirit thereof.

What is claimed is:

1. A text data registering and retrieving method for registering the occurrence relation of characters appearing in a document in a plural-character occurrence file as a text index and retrieving a document satisfying designated query terms with reference to the occurrence relation in said plural-character occurrence file, comprising:

an update document number registration step of registering, in an updated document number list, the document number of a document which is requested to be updated;

an update text buffer preparation step of registering in an update text buffer, text data of the document which is newly requested to be updated;

a plural-character occurrence file merge step of registering the text data, stored temporarily in said update text buffer, in the plural-character occurrence file;

a plural-character occurrence file merge condition determining step of determining the timing of performing said plural-character occurrence file merge step;

a plural-character occurrence file retrieval step of searching the data registered in the plural character occurrence file for said designated query terms;

an update text buffer retrieval step of searching the text data stored in said update text buffer for said designated query terms; and a retrieval result merge step of merging the result obtained in said update text buffer retrieval step with the result of retrieval in said plural-character occurrence file retrieval step.

2. A text data registering and retrieving method according to claim 1, wherein said plural-character occurrence file merge step is performed in response to the determination in said plural-character occurrence file merge condition determining step that a specific number of documents is registered in said update text buffer.

3. A text data registering and retrieving method according to claim 1, wherein said plural-character occurrence file merge step is performed in response to the determination in said plural-character occurrence file merge condition determining step that the time required for the process of registration in said updated document number list and said update text buffer exceeds a specified length of time.

4. A text data registering and repriving method according to claim 1, wherein said plural-character occurrence file merge step is performed in response to the determination in said plural-character occurrence file merge condition determining step that the time required for the process in said update text buffer retrieval step and said retrieval result merge step exceeds a specified length of time.

5. A text data registering and retrieving method according to claim 1, wherein said updated document number registration step includes a substep of registering the document number of a document requested for replacement in said updated document number list, said update text buffer preparation step includes a substep of registering the text data of the document requested for replacement in said update text buffer, and said retrieval result merge step includes a substep of deleting the document number of a replaced document as an invalid document from the result of said retrieval and adding the result obtained in said update text buffer retrieval step to the result of retrieval in said plural-character occurrence file retrieval step.

6. A text data registering and retrieving method for registering the positional relation of characters appearing in a document in a plural-character occurrence file as a text index together with a corresponding document number and retrieving a document satisfying designated query terms with reference to the positional relation of said characters in said plural-character occurrence file, comprising:

an updated document number registration step for registering in an updated document number list the document number of a document for which deletion or replacement has been newly requested;

an update text buffer preparation step for registering in an update text buffer at least a piece of information indicating the positional relation of the characters appearing in a document for which insertion or replacement has been newly requested anew;

a plural-character occurrence file merge step for registering in the plural-character occurrence file a text data temporarily stored in the update text buffer;

a plural-character occurrence file merge condition determining step for determining the timing of performing said plural-character occurrence file merge step;

a plural-character occurrence file retrieval step for searching the data registered in said plural character occurrence file for said designated query terms;

an update text buffer retrieval step for searching said text data stored in said update text buffer and at least one piece of said information indicating this positional relation of characters for said designated query terms; and a retrieval result merge step for deleting the document number of the updated or deleted document as an invalid document from the result of retrieval in said plural-character occurrence file retrieval step, merging the result obtained in said update text buffer retrieval step with said result of retrieval after deletion, and outputting the document number to be finally retrieved.

7. A text data registering and retrieving method according to claim 6, wherein said plural-character occurrence file merge condition determining step performs said plural-character occurrence file merge step after registering a specific number of documents in said update text buffer.

8. A text data registering and retrieving method according to claim 6, wherein said plural-character occurrence file merge condition determining step performs said plural-character occurrence file merge step when the time required for the process of registration in said updated document number list and said update text buffer exceeds a predetermined time length.

9. A text data registering and retrieving method according to claim 6, wherein said plural-character occurrence file merge condition determining step performs said plural-character occurrence file merge step when the time required for the process in said update text buffer retrieval step and said retrieval result merge step exceeds a predetermined time length.

10. A text data registering and retrieving method according to claim 6, wherein said update text buffer preparation step includes a substep of selecting one of an original text buffer format and a plural-character occurrence table format.

11. A computer-readable recording medium for storing a computer-executable program for registering in a plural-character occurrence file as a text index the occurrence relation of characters appearing in a document together with a corresponding document number and retrieving a document satisfying designated query terms with reference to said occurrence relation of characters appearing in said plural-character occurrence file, said program including:

updated document number registration program means for registering the document number of a document, for which insertion, deletion or replacement is newly requested, in an updated document number list;

update text buffer preparation program means for registering text data of a document, for which insertion or replacement has been newly requested, in an update text buffer;

plural-character occurrence file merge program means for registering the text data temporarily stored in the update text buffer in the plural-character occurrence file;

plural-character occurrence file merge condition determining program means for determining the timing of performing said plural-character occurrence file merge step;

plural-character occurrence file retrieval program means for retrieving the data registered in the plural-character occurrence file;

update text buffer retrieval program means for retrieving the text data stored in said update text buffer; and retrieval result merge program means for deleting the document number of the document updated or deleted from the result of the retrieval in said plural character occurrence file retrieval step and merging the result obtained in said update text buffer retrieval step to provide a final retrieval output.

12. A computer-readable recording medium for recording a program for causing a computer to perform:

an updated document number registration step for registering the document number of a document, for which updating has newly been requested, in an updated document number list;

an update text buffer preparation step for registering text data of the document, for which updating has been newly requested, in an update text buffer;

a plural-character occurrence file merge step for registering the text data temporarily stored in the update text buffer in a plural-character occurrence file as a text index;

a plural-character occurrence file merge condition determining step for determining the timing of performing said plural-character occurrence file merge step;

a plural-character occurrence file retrieval step for retrieving the data registered in the plural character occurrence file with respect to query terms;

an update text buffer retrieval step for retrieving the text data stored in said update text buffer with respect to said query terms; and a retrieval result merge step for merging the result obtained in said update text buffer retrieval step with the result of retrieval in said plural-character occurrence file retrieval step.

13. In a text data registering and retrieving system including a database storing a plurality of document files therein and a plural-character occurrence table for a text index and an update text buffer to retrieve a target document in cooperation with said database, a method for registering the occurrence of plural characters in a document in said plural-character occurrence table and retrieving a document satisfying designated query terms with reference to the occurrence relation of characters in said plural-character occurrence table comprising the steps of:

registering, in said update text buffer, text data of a document which is requested to be updated;

searching the data registered in said plural-character occurrence table for the designated query terms;

searching the text data stored in said update text buffer for said designated query terms; and merging the result obtained in said update text buffer searching step with the result of retrieval in said plural-character occurrence table searching step to provide a final search output;

further comprising the steps:

transferring the text data stored in said update text buffer into said plural-character occurrence table for updating; and determining the timing of performing said text data transfer to said plural-character occurrence table in accordance with a predetermined file merge condition.

14. The method according to claim 13, wherein said update text buffer has the same data format as that of said plural-character occurrence table.

15. The method according to claim 13, wherein said update text buffer has a storage area which holds a text of the document for which updating is requested and is adapted to be scanned.

16. The method according to claim 13, further comprising the steps of:

providing a data storage area for establishing an update document number list;

registering the document number of a document, whose updating is requested, in said update document number list; and deleting the document number of a document for which replacement or deletion is requested, from the result of the retrieval in said plural-character occurrence table retrieving step, as an invalid document and providing the result obtained in said update text buffer retrieving step as a final search output.

17. In a text data registering and retrieving system including a database storing a plurality of document files therein, a database management system, a plural-character occurrence table for a text index and an update document number list to retrieve a target document in cooperation with said database, a method for registering the occurrence relation of plural characters in a document in said plural-character occurrence table and retrieving a document satisfying designated query terms with reference to the occurrence relation in said plural-character occurrence table comprising the steps of:

registering, in said update document number list, the number of a document which is newly requested to be updated and registering the text data of said document in said database;

searching the data registered in said plural-character occurrence table for the designated query terms;

fetching the update text data from said database referring to said update document number list;

searching said update text data fetched in said database for said designated query terms; and merging the result obtained in said update text buffer searching step with the result of retrieval in said plural-character occurrence table searching step to provide a final search output;

further comprising the steps:

transferring the update text data fetched from said database into said plural-character occurrence table for updating; and determining the timing of performing said text data transfer to said plural-character occurrence table in accordance with a predetermined file merge condition.

18. A computer-readable recording medium for storing a program executed by the computer for operating a text data registering and retrieving system including a database storing a plurality of document files therein and a plural-character occurrence table for a text index and an update text buffer to retrieve a target document in cooperation with said database, wherein the occurrence relation of plural characters in a document is registered in said plural-character occurrence table and a document satisfying designated query terms with reference to the occurrence relation in said plural-character occurrence table is retrieved, said program comprising:

program means for registering in said update text buffer, text data of a document which is newly requested to be updated;

program means for searching the data registered in said plural-character occurrence table for the designated query terms;

program means for searching the text data stored in said update text buffer for said designated query terms; and program means for merging the result obtained in said update text buffer searching with the result of retrieval in said plural-character occurrence table searching to provide a final search output;

program means for transferring the update text data fetched from said database into said plural-character occurrence table for updating; and program means for determining the timing of performing said text data transfer to said plural-character occurrence table in accordance with a predetermined file merge condition.

19. A computer-readable recording medium for storing a program for operating a text data registering and retrieving system including a database storing a plurality of document files therein, a database management system, a plural-character occurrence table for a text index and a document number list to retrieve a target document in cooperation with said database, wherein an occurrence relation of plural characters in a document is registered in said plural-character occurrence table and a document satisfying designated query terms with reference to the occurrence relation in said plural-character occurrence table is retrieved, said program comprising:

program means for registering, in said update document number list, the number of a document which is newly requested to be updated and registering the text data of said document, in said database;

program means for searching the data registered in said plural-character occurrence table for the designated query terms;

program means for fetching the update text data from said database referring to said update document number list;

program means for searching said update text data fetched in said database, for said designated query terms; and program means for merging the result obtained in said update text buffer searching with the result of retrieval in said plural-character occurrence table searching to provide a final search output;

program means for transferring the update text data fetched from said database into said plural-character occurrence table for updating; and program means for determining the timing of performing said text data transfer to said plural-character occurrence table in accordance with a predetermined file merge condition.

* * * * *